(12) United States Patent
Kerst et al.

(10) Patent No.: US 12,263,621 B2
(45) Date of Patent: Apr. 1, 2025

(54) INDIRECT METAL MOLD FOR DIRECTIONAL DRY ADHESIVES

(71) Applicant: The Board of Trustees of the Leland Stanford Junior University, Stanford, CA (US)

(72) Inventors: Capella F. Kerst, Los Gatos, CA (US); Mark R. Cutkosky, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 213 days.

(21) Appl. No.: 17/769,832

(22) PCT Filed: Nov. 13, 2020

(86) PCT No.: PCT/US2020/060570
§ 371 (c)(1),
(2) Date: Apr. 18, 2022

(87) PCT Pub. No.: WO2021/097334
PCT Pub. Date: May 20, 2021

(65) Prior Publication Data
US 2022/0371230 A1  Nov. 24, 2022

Related U.S. Application Data

(60) Provisional application No. 62/936,325, filed on Nov. 15, 2019.

(51) Int. Cl.
B29C 33/42   (2006.01)
B29C 33/38   (2006.01)
B29K 105/00  (2006.01)

(52) U.S. Cl.
CPC .......... B29C 33/42 (2013.01); B29C 33/3842 (2013.01); *B29K 2105/0097* (2013.01); *B29K 2905/00* (2013.01)

(58) Field of Classification Search
CPC ..... B29C 33/68; B29C 33/42; B29C 33/3842; B29K 2905/00; B29K 2105/00
See application file for complete search history.

(56) References Cited

U.S. PATENT DOCUMENTS 8,563,117 B2  10/2013  Messersmith
9,060,842 B2   6/2015  Karp
(Continued)

FOREIGN PATENT DOCUMENTS

| CN | 110355911 | 10/2019 |
|----|-----------|---------|
| WO | WO2010036801 | 4/2010 |
| WO | WO2016094557 | 6/2016 |

*Primary Examiner* — Alison L Hindenlang
*Assistant Examiner* — Debjani Roy
(74) *Attorney, Agent, or Firm* — LUMEN PATENT FIRM

(57) ABSTRACT

The present invention provides a metal mold and the method of making the metal mold for casting directional gecko-inspired adhesives that require deep, slanted features and an undercut wedge structure. The durable metal mold can be used for high quantities. In one example, compression molding is used to mass produce the adhesives. What normally takes 24 hours to produce now with compressing molding takes 5 minutes. Compression molding allows us to increase daily production from 1 adhesive patch to thousands per day.

1 Claim, 15 Drawing Sheets

(56) References Cited

U.S. PATENT DOCUMENTS

| | | | |
|---|---|---|---|
| 2012/0126458 A1* | 5/2012 | King | G03F 7/0017 264/405 |
| 2016/0046043 A1* | 2/2016 | Cutkosky | B29C 33/424 264/219 |
| 2016/0082502 A1* | 3/2016 | Appleby | B22C 9/10 164/369 |

* cited by examiner

- - - - - - Wax block 1210
——— Wafer 1220
- - - - UV Tape + Primer 1230
——— Wedges 1240
- - - - - Unfilled PDMS 1250
- - - - - Tape 1260
═════ Shims with tabs 1270
——— Polished weight 1280

FIG. 12

INDIRECT METAL MOLD FOR DIRECTIONAL DRY ADHESIVES

FIELD OF THE INVENTION

This invention relates to molds for casting directional gecko-inspired adhesives.

BACKGROUND OF THE INVENTION

Directional, gecko-inspired adhesives, like the setal stalks of the gecko, have the property that they are not sticky in the default state, but produce adhesion when loaded in shear. This property is useful for climbing robots, allowing them to attach and detach their feet with very little effort while also adhering firmly to smooth surfaces when they take a step or gripping the surfaces of objects. In typical applications they sustain 60 kPa in shear and 10 kPa in normal stresses, depending on loading direction and conditions. Despite these useful properties, one reason they remain rare is that they are currently produced in very small quantities in an exacting manual process, using molds that only last a few cycles. Accordingly, there is a need in the art to develop durable molds for directional, controllable gecko-inspired adhesives. The present invention addresses this need.

SUMMARY OF THE INVENTION

The present invention provides a metal mold and the method of making the metal mold for casting directional gecko-inspired adhesives that require deep, slanted features and an undercut wedge structure. Previous efforts to make directional gecko-inspired adhesives have used non-durable molds of wax or epoxy. These molds have very limited lifetime and are not suitable for eventual high-volume manufacturing of the adhesive.

The directional adhesives require microscopic inclined features with a challenging combination of tapered geometry, high aspect ratio, and smooth surface finish. Wedge-shaped features produced by the metal mold as provided herein exhibit the same geometry and surface finish as those cast from single-use wax molds and epoxy molds in previous fabrication methods. They also produce the same levels of adhesion and shear stress. The metal molds, and the adhesives cast from them, show no degradation after repeated molding cycles.

In one aspect, the invention is defined as a metal mold for casting directional dry adhesive wedges whereby the metal mold is made via an indirect tooling method. The metal mold distinguishes an array of features defined in a plane with a thickness h, wherein the array of features is capable of casting or forming an array of directional dry adhesive wedges. The features are defined orthogonal to the plane. Each feature is a triangle with acute angles with respect to the plane. One of the sides has an acute angle λ. Adjacent triangle tips are spaced by distance S, and the two sides of each triangle are spaced by 2β. The metal mold further distinguishes a base surrounding the plane of the array of features with a base thickness A, A is larger than h. The base is capable of casting or forming a backing layer for the array of directional dry adhesive wedges.

Regarding dimensions for the metal mold, one embodiment defines those as follows:
h is in a range of 60 micrometers to 100 micrometers, preferably about 100 micrometers,
A is in a range of 50 to 150 micrometers, preferably about 50 micrometers,
λ is in a range of 55 degrees to 65 degrees, preferably about 60 degrees,
r is in a range of 0.5 micrometers to 2 micrometers, preferably about 1 micrometer,
s is in a range of 50 micrometers or 60 micrometers, preferably about 50 micrometers, and/or
β is in a range of 7 degrees of 8 degrees, preferably about 7.5 degrees.

In another embodiment, the preferred dimensions can range ±10 percentage from the preferred values.

In another aspect, the invention is a method of casting an array of directional dry adhesive wedges with a backing layer using the metal mold. The casting of the array of directional dry adhesive wedges with a backing layer could be performed by injection molding, compression casting, heat molding, or a combination thereof. The casting techniques could be a direct pour of silicone, or uncrossed linked polymer, calendar silicone rubber or polymer sheets, heat cure silicone rubber or other heat cure materials, with curing methods of heat, compression casting or injection molding. It is also possible to cast into the metal mold and let it room temperature cure as well.

In yet another embodiment, the invention is a method of making a metal mold for casting an array of directional dry adhesive wedges with a backing layer by making the metal mold out of a metal stack up of metal layers. The metal mold is made with an initial layer which is sputtered to create a uniform thin film on a daughter mold layer to which electroplating can be build an electroplate surface layer to which a backing plate can be laid down.

The electroplating metal choice is something you can electroplate and is hard. The electroplate surface needs to be something you can braze or solder to a backing plate. The solder can be anything with similar enough coefficient of thermal expansion to not have warping. The backing plate needs to be thermally and solder/brazing compatible with the stack.

In yet another aspect, the invention is a method of making a dry adhesive metal mold. The method includes attaching a metal backing to a backside of the wedges, sputtering a thin layer of release metal on the wedges, electroplating a metal on the release metal layer to a thickness greater than the height wedge tips, using solder to float a top mold plate on the electroplated surface to align the top mold plate parallel to the metal backing while the solder is in a float-state, and releasing the wedges from the electroplated metal to form the dry adhesive metal mold.

The choice of metals is quite wide for the whole stack, e.g. copper, nickel, etc. The initial layer needs to be able to be sputtered and create a uniform thin film on a daughter mold to which electroplating can build up from there. The next operation electroplating metal choice is something you can electroplate and is hard. The electroplate surface needs to be something you can braze or solder to a backing plate. The solder can be anything with similar enough coefficient of thermal expansion to not have warping. The backing plate again needs to be thermally and solder/brazing compatible.

In another embodiment, a method of making a metal mold for casting an array of directional dry adhesive wedges with a backing layer is provided where the metal mold is made out of a metal stack up of metal layers. The metal mold has an initial layer which is sputtered on to create a uniform film on a daughter mold layer to which electroplating builds an electroplate surface layer to which a backing plate is laid down.

In yet another embodiment, a method of casting an array of directional dry adhesive wedges with a backing layer using a device for casting directional dry adhesive wedges is provided. The device has a metal mold that distinguishes:
- an array of features defined in a plane with a thickness h. The array of features is capable of casting or forming an array of directional dry adhesive wedges, the features are defined orthogonal to the plane. Each feature is a triangle with acute angles with respect to the plane, where one of the sides has an acute angle $\lambda$, where adjacent triangle tips are spaced by distance S, and where the two sides of each triangle are spaced by $2\beta$, and
- a base surrounding the plane of the array of features with a base thickness A, where A is larger than h, where the base is capable of casting or forming a backing layer for the array of directional dry adhesive wedges.

The casting of this array of directional dry adhesive wedges with a backing layer is performed by injection molding, compressing molding, compression casting, heat molding, or a combination thereof. h is in a range of 60 micrometers to 100 micrometers, preferably about 100 micrometers, A is in a range of 50 to 150 micrometers, preferably about 50 micrometers, $\lambda$ is in a range of 55 degrees to 65 degrees, preferably about 60 degrees, r is in a range of 0.5 micrometers to 2 micrometers, preferably about 1 micrometer, s is in a range of 50 micrometers or 60 micrometers, preferably about 50 micrometers, and/or $\beta$ is in a range of 7 degrees of 8 degrees, preferably about 7.5 degrees.

In still another embodiment, a device for casting directional dry adhesive wedges is provided as defined herein. The metal mold is made via an indirect tooling method.

In still another embodiment, a method is provided to change the tip geometry by post-treatment.

In still another embodiment, a method is provided to replicate the post-treated geometry in the wax mold.

Advantages of embodiments of the invention are a durable mold which can be used for high quantities. Another advantage of an all-metal mold is that it can be used to process polymers for the adhesives at high pressure and temperature, allowing new polymers to be used. Yet another advantage is that the metal mold can be cleaned with chemicals and processes that the wax and SU-8/quartz mold cannot.

BRIEF DESCRIPTION OF THE DRAWINGS

in FIG. 7 correspond to: A=Setup and Preparation, B=Press, C=Curing, D=Removing from the Press, E=Removal of part, F=Compressing Molded Part as detailed in the text.

in FIG. 12 correspond to: A=Initial Casting, B=Demold, C=Runners Removed, D=Spin Coat Unfilled PDMS, E=Place Wafer Face Down onto Wedges, F-H=Positioning the Inked Surface, I=Inking, J=Inked Wedges, K=Curing, L=Cured, and M=Runner Place Back on the Wafer as described in the text.

in FIG. 13 correspond to: A=Start Wedges, B=Heat Wax, C=Guarantee Parallelism and Cooling, D=Hardened Wax, E=Wax Mold with Post Treated Geometry, F=Casting into New Wax Mold, and G=Post Treated as described in the text.

DETAILED DESCRIPTION

Anisotropic Adhesive Geometry and Fabrication

Figure 1:
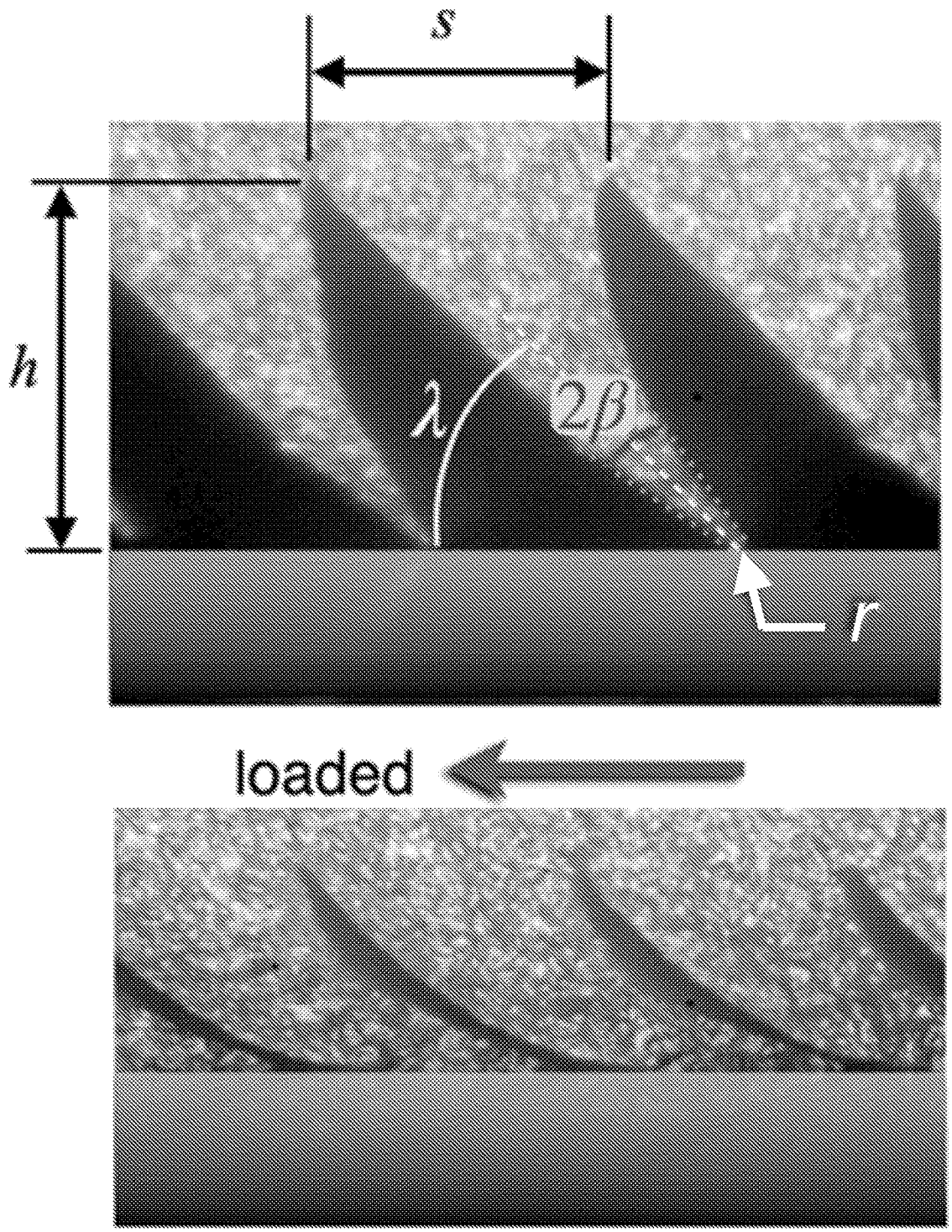
FIG. 1 shows gecko-inspired adhesives according to an exemplary embodiment of the invention. When not loaded, gecko-inspired adhesives have a small contact area and are not sticky; loading them in shear increases the contact area, producing adhesion. Wedges are molded in the un-loaded shape with dimensions as labeled: wedge height, h=90 μm; wedge spacing, s=50 μm; wedge inclination angle (un-loaded), $\lambda$=15°; wedge tip half-angle, $\beta$=7.5°; wedge tip radius, rtip≈1 μm. These dimensions collectively present a challenge for mold fabrication.

The distinguishing characteristic of the adhesives is that they are non-sticky in their default state but produce adhesion via van der Waals forces when loaded in shear (FIG. 1). The behavior is similar to that of the adhesive system of the gecko. The controllable on-off adhesion arises from having long, tapered, and angled wedges that bend to form a nearly continuous contact as seen in the bottom image in FIG. 1. The amount of bending, and hence the amount of adhesion, is proportional to the magnitude of the applied shear force. Releasing the shear load allows the wedges to spring back to their original shape, eliminating the adhesion.

Directional adhesives have also been demonstrated that require asymmetric or angled microscopic features. These adhesives do not have the extent of overhanging and tapering seen in FIG. 1 and are not as strongly directional, i.e. they typically require some preload to adhere and/or some peeling force to detach. Notably, the geometry in FIG. 1 precludes most lithographic techniques.

An increasingly promising alternative to angled lithography is direct 3D printing at the microscale. Two-photon lithography for example can achieve sub-micron voxels, to approximate the even more demanding microscopic geometry of gecko setae. However, the process is very slow, resulting in a small (less than 1×1 mm) sample of UV-cured polymer stalks that exhibited modest adhesion.

In these examples, the need for tilted, asymmetric and/or tapering microscopic geometries imposes manufacturing challenges. In addition, the resulting molds or positive geometries are created from materials like SU-8 photoresist or from polysilicon wafers, which are not as durable as the metal molds typically used for manufacturing of plastic or elastomeric components at scale.

Another alternative to lithography is direct micromachining or electrodischarge machining, however the required overhanging features and very sharp groove bottoms (≤1 μm tip radius) again preclude many approaches. One technique that can produce grooves directly in metal at the required scale and with similar geometry is single-point diamond machining, as traditionally used for creating diffraction gratings and other optical components. Diamond turning has been used to create an aluminum mold with grooves similar to those needed for microwedges. However, most of the grooved surfaces appear to be less deep and narrow than those in FIG. 1 and not overhanging. Furthermore, the profiles closest to those required for directional adhesion showed relatively low adhesive performance.

Indirect Tooling

Although it is difficult using lithographic, 3D additive manufacturing or metal micromachining techniques to create a durable mold that can produce the directional adhesive features defined in FIG. 1, another approach is possible using indirect tooling. In indirect tooling, a non-durable mold is used to create a positive geometry, which is then used to create a durable second-generation mold using electroplating, metal spray or other processes. LIGA employs X-ray or UV lithography to create high-aspect ratio features, followed by electroplating to create a durable mold. Similar processes have been used to create molds for microfluidic channels and devices. However, the sharp, angled, and tapered geometry seen in FIG. 1 is not found in the art.

Metal Mold Fabrication Process

Figure 2:
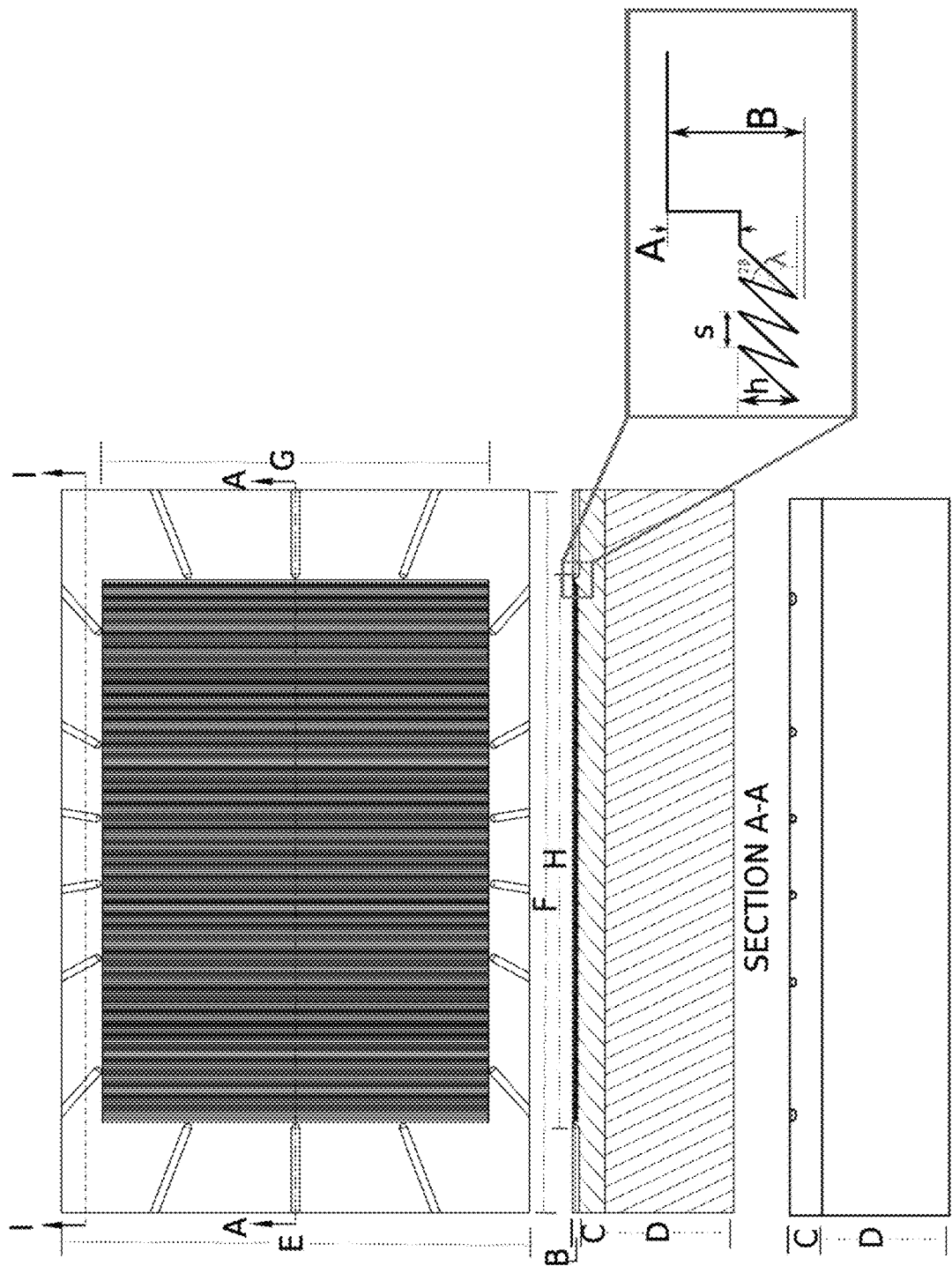
FIG. 2 shows according to an exemplary embodiment of the invention an isometric view of a mold (wax or metal). A=150 μm is the thickness of the backing layer for the reference flats from the wedge base; B=250 μm is the total thickness of wedges plus backing layer.

Creation of a metal mold begins with the same direct machining in wax that has been used to create molds for the adhesives shown in FIG. 1. That process is summarized briefly here for context. FIG. 2 shows a mold. Wedge features and channels for excess silicone are cut into a 6 mm thick soft wax layer on the upper surface. The soft wax layer is supported by an approximately 40 mm thick block of hard wax. The narrow, angled grooves for the wedges are created using a polished PTFE-coated microtome blade (D554X, C. L. Sturkey) with a machining trajectory that is a hybrid of indenting and orthogonal machining; it loads the blade primarily in compression and it continually pushes chip material forward to prevent damaging previously created grooves. Silicone rubber is cast into the mold, followed by a backing material which is aligned to ensure parallelism with the wedge tips. Depending on the intended application, the backing material can be either a stiff plate or a thin film.

Unfortunately, the wax mold loses its accuracy after one or two casting cycles. A somewhat more durable mold can be created by using the cast silicone rubber as a positive to create a second-generation daughter mold from epoxy (Epox-Acast 670HT, Smooth-On). The epoxy mold is supported internally by longitudinal and transverse spars of aluminum or carbon fiber to prevent warping during oven curing and has a parylene coating to facilitate demolding. One mold has lasted more than 50 cycles, yet other molds last 10 cycles or less.

An alternative starting point for the remaining steps is to use silicone rubber wedges cast from an SU-8 mold. These wedges have a slightly different geometry, but similar performance to those cast from wax.

Metal Mold Fabrication Process

Figure 3:
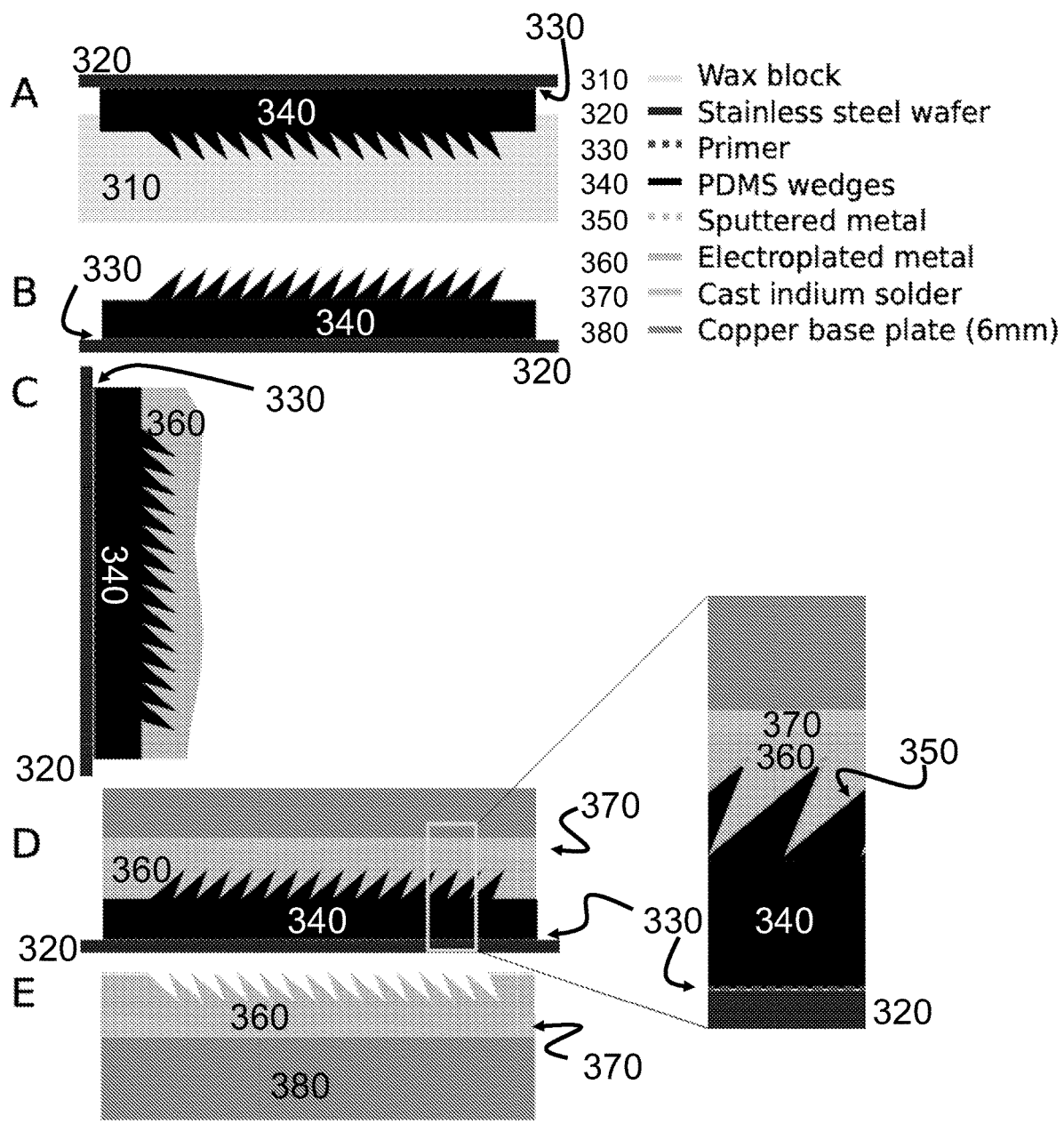
FIG. 3 shows according to an exemplary embodiment of the invention cross sectional views (not to scale) of steps in the metal mold process: A) Cast silicone rubber positive in wax. B) Sputter titanium and platinum. C) Electroplate copper. D) Solder bond to 6 mm copper block. E) Disassemble to uncover metal mold surface. Labels match paragraphs in the text.

The main steps of the mold fabrication process are shown in FIG. 3. Labels A, B, etc. in FIG. 3 correspond to: A=Initial Casting, B=Sputtering, C=Electroplating, D=Soldering, and E=Disassembly as described below.

Initial Casting (A)

The process starts with casting silicone rubber into a micromachined wax mold, using a 2 mm thick, 150 mm diameter stainless steel wafer or quartz with a UV tape as backing material. The wafer is treated with a primer (PR-1200, Dow Corning) to promote adhesion to the silicone. It is important to maintain parallelism between the wedge tops and the backing. The wafer provides a sturdy, conductive reference plane for subsequent steps.

Sputtering (B)

After demolding and vacuum degassing, the wafer and wedges are sputtered with 5 nm of titanium and 195 nm of platinum. The titanium provides good initial adhesion and the platinum provides a uniform seed layer for subsequent electroplating. The sputtering occurs in near vacuum at 3 mTorr.

Electroplating (C)

Copper is electroplated to a thickness of 200 μm. This layer is roughly double the height of the wedges, but too thin for a durable mold. In addition, the electroplating process results in a slightly non-planar back surface, which necessitates the next step.

Soldering (D)

The copper backing is cleaned and prepared with flux for furnace soldering to a 6 mm thick base block of copper or brass. The wafer was used as a reference surface for the base block to maintain parallelism with the wedge tips, allowing a thin layer of indium solder to fill the gap. In experiments, low-temperature indium solder produced fewer problems associated with uneven cooling and shrinkage than other castable filler metals.

Disassembly (E)

The base block is ground to provide a smooth surface and the silicone wedges and wafer are pulled away from the metal mold surface. This step requires some effort as the sputtering and electroplating have produced a metal surface that is firmly adhered to the silicone. At present, the best solution has been to use solvent (Digesil NC-X, RPM Technology) to attack the silicone. After a final rinse with acetone and ethanol the mold is ready for use.

The mold is now ready for casting adhesive samples following the same process as used previously with one-time molds in wax and limited-use molds of SU-8. The inventors have not found it necessary to use a mold release agent to facilitate demolding.

Results

Figure 4:
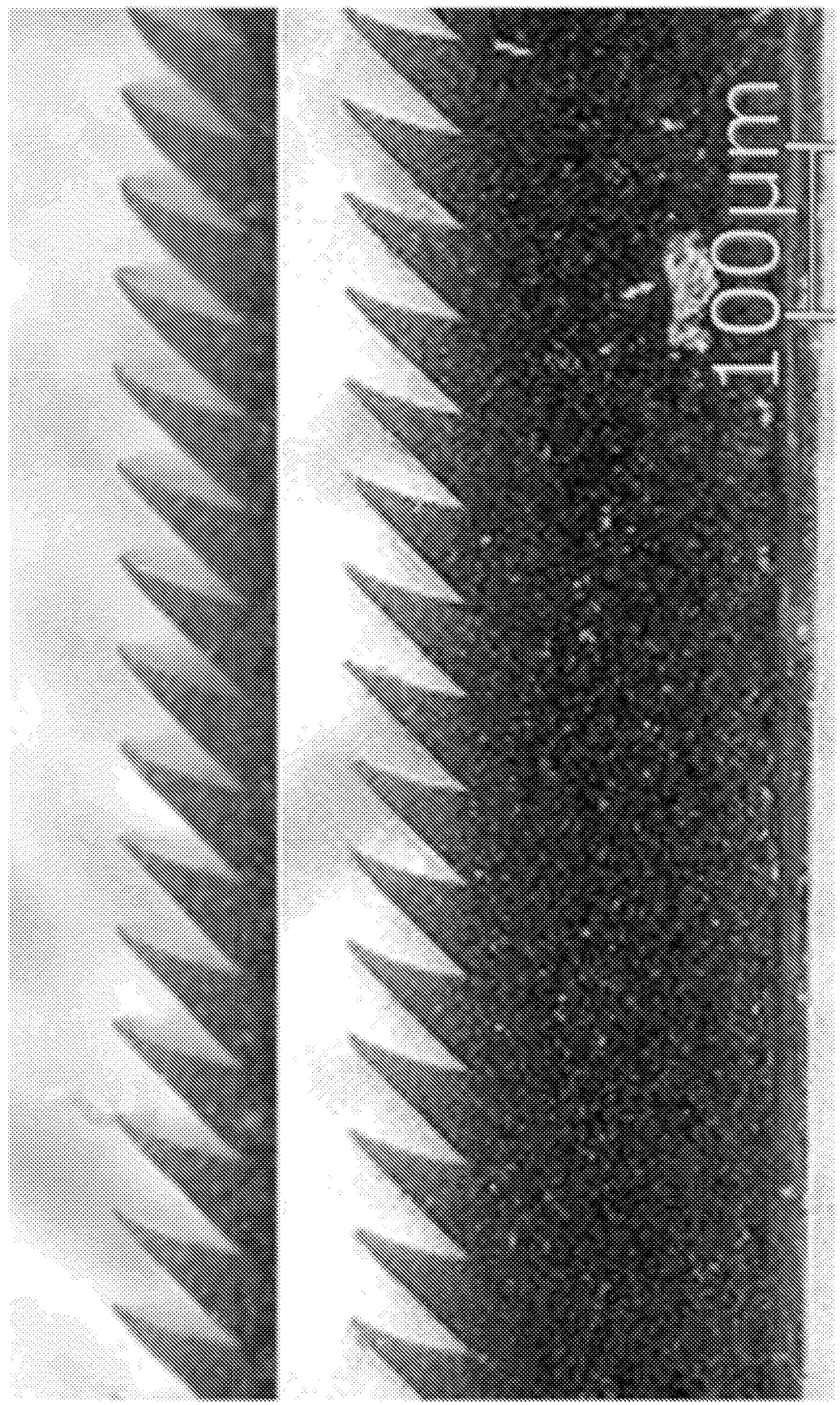
FIG. 4 shows according to an exemplary embodiment of the invention a upper microscopic cross section from the $10^{th}$ casting from a metal mold. The image below shows a section of wedges with a kapton film backing, cast from a wax mold, for comparison. The images were taken on the Keyence VHX-6000 with magnification 200×, darkfield "ring" lighting. Table 1 compares the geometric parameters, as defined in FIG. 1, for the two cases.

A first test is to establish whether, at the microscopic scale, adhesives cast from the metal mold preserve the sharp, angled wedge profiles as obtained from wax molds. FIG. 4 shows comparative microscopic images of wedges cast from metal and wax molds. These images are obtained by sectioning the PDMS material vertically and mounting specimens under a microscope to examine their profiles.

Table 1 lists geometric parameters measured from each of the two microscope images. While there is some variation between measured heights and inclination angles, it is not clear whether this is due to variability in the wax machining process or the metal mold fabrication. In either case, adhesive performance is not highly sensitive to small variations in these parameters.

TABLE 1

Comparison of geometric parameters (defined in FIG. 1) for the samples in FIG. 4 cast from metal and wax molds, respectively. Dimensions measured from microscope images at 200X magnification for 20 wedges; μ and σ are the mean and standard deviation.

| | Wax Mold | | Metal Mold | |
|---|---|---|---|---|
| Parameter | μ | σ | μ | σ |
| height, h (μm) | 87.6 | 3.6 | 81.6 | 4.3 |
| spacing, s (μm) | 61.6 | 2.6 | 61.5 | 2.1 |
| inclination, λ (°) | 62.8 | 3.2 | 57.7 | 2.2 |
| half angle, β (°) | 15.3 | 1.0 | 14.9 | 0.9 |
| tip radius, $r_{tip}$ (μm) | 1.0 | 0.2 | 1.0 | 0.1 |

The performance of the wedges also depends on the surface finish, especially for the faces on the leading surfaces of the wedges, i.e. the faces that come into contact with an adherend surface.

Figure 5:
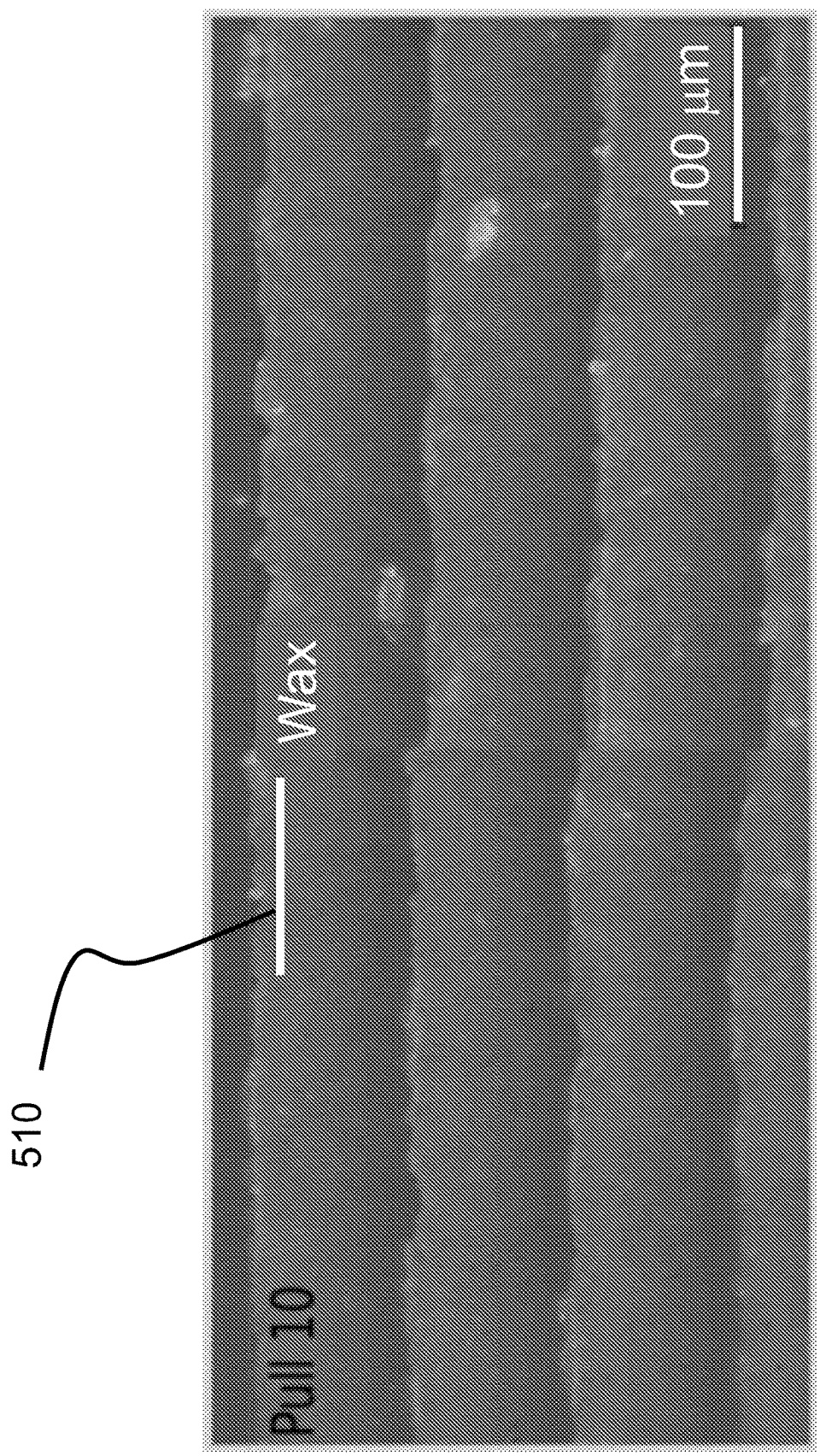
FIG. 5 shows according to an exemplary embodiment of the invention tips of wedges from a 10th casting from a metal mold (left) and from a wax mold (right). The surface roughness (Ra) was measured along a 100 μm line parallel to the wedge tips; 510 is a representative line. Measured roughness ranges from 0.25-0.71 μm on samples cast from both the metal and wax molds. The images were taken on the Keyence VHX-6000 with magnification 500×, brightfield "coaxial" lighting.

FIG. 5 shows images of wedges at 500× magnification for samples cast from metal and wax molds. In both cases the surface finish (Ra) ranges from 0.25 μm to 0.71 μm as measured along 100 μm lines parallel to the wedge tips (representative line 510 shown in FIG. 5).

Figure 6:
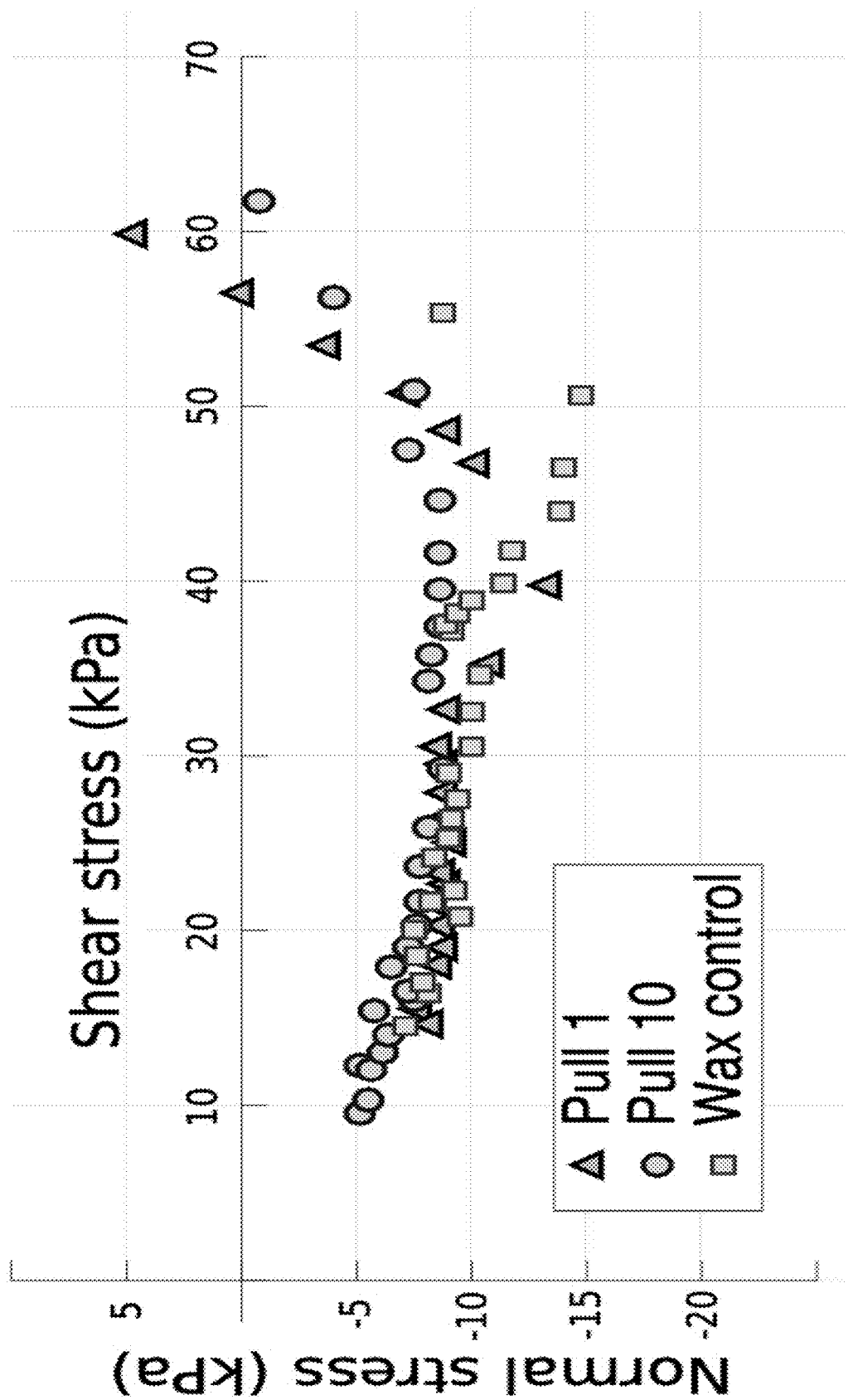
FIG. 6 shows according to an exemplary embodiment of the invention limit curves of shear and adhesive stresses obtained from adhesive samples with film backing, measured with pull off angles ranging from 0° (normal) to 90° (tangential). Measured limit curves for the first and tenth samples from the metal mold are comparable to those from a single-use wax mold.

Having established that wedges cast from the metal mold have the same surface finish and geometry as those from a wax mold, the definitive test is whether they produce the same adhesion. FIG. 6 shows limit curves for wedges from the first and tenth castings from a metal mold in comparison to those from a wax mold. The empirical limit curves are created by bringing a patch of adhesive, typically approximately 6×6 mm square, into contact with a smooth surface and then pulling it away with a departure angle that ranges from nearly perpendicular to nearly tangential to the surface, while recording the normal and tangential force components as the adhesive loses contact. Each point thus represents the adhesive stress supported by the adhesive in that direction. The result, when plotted with shear stress on the horizontal axis and adhesive (negative) normal stress on the vertical axis, represents the limit curve for the adhesive. Under equivalent loading conditions, any combination of normal and shear stress inside the empirical limit curve would be sustained by the adhesive and any force exceeding it would cause failure. If the adhesives from the two molding processes have the same material, geometry, and surface finish, then this should result in the same measured limit curve for each.

There is some test-to-test variability even with the same adhesive and surface. Hence there is a certain amount of scatter in the data, especially for loading conditions that approach purely tangential (i.e., pure shear). Nonetheless, inspection of the data in FIG. 6 reveals two results. The first is that the first and tenth pull results are indistinguishable from each other, which indicates that the metal mold is not deteriorating nor is silicone becoming stuck in the bottoms of the grooves, which define the wedge tips. The second point is that the metal mold results are comparable to those from a typical single-use wax mold.

Compression Molding

In another embodiment of the invention compression molding is used to mass produce the adhesives. What normally takes 24 hours to produce now with compressing molding takes 5 minutes. Compression molding allows us to increase daily production from 1 adhesive patch to thousands per day. Compression molding is the process of taking an unvulcanized silicone rubber inserting it in the mold cavities, applying a high pressure and increased temperature to cure the rubber into the desired geometry of the mold. The challenge here for compressing molding is the thin sheets with undercut micro structures.

With compression molding, the same material can be cured in 5 minutes opposed to a 24 hour cure time without heat. The expedited curing times will make mass manufacturing of the adhesive much more realistic. The throughput of the adhesive needs to be in minutes not hours for the cost of the adhesive to come down making it more accessible to the general public and not an artisan product.

Compression molding expands the possible adhesive materials to materials that could not fill the mold without pressure or could not be cured at room temperature. The benefits from the properties of these new materials would lead to longer life of the adhesive especially if the application calls for thousands of cycles per hour of use. The NuSil examined for the purposes of this invention were chosen to have a similar durometer to the Sylgard that has been used in the past. The importance of keeping in the same durometer regime is to guarantee wedges would be around the same hardness when encountered with dirt and other particles. The dirt would not embed or tear the wedges.

Compression Molding Materials

Silicone rubbers come in a range of durometers, characteristics during mixing and after cured (Table 2). Some of these materials tend to be more brittle and cracks tend to propagate more easily while others can strength up to 400× their length without tearing. Different NuSil silicone rubbers were prepared and used to compared to current Sylgard 170 which are cast into wax or epoxy molds.

TABLE 2

Material properties for different silicone rubbers.

| Material | Durometer (Shore A/ Type A) | Tear Strength (ppi) | Tensile Strength (MPa) |
| --- | --- | --- | --- |
| Sylgard 170 | 47 | 20 | 2.9 |
| NuSil MED-4735 | 35 | 195 | 10.6 |
| NuSil MED-6015 | 50 | N/A | 8.28 |
| NuSil MED-4950 | 50 | 243 | 6.9 |

The material property comparisons are shown in Table 3. The different materials have been used to make molds for the directional adhesive. The life of the mold material seems to correlate to yield strength as the molding process produces stress to the fine features and can cause slow deformation over time or breaking of the features especially during de-molding.

TABLE 3

Material properties for different metals.

| Material | Yield Strength (MPa) | Young's Modulus (GPa) | Hardness (Mohs) |
| --- | --- | --- | --- |
| Wax | 6.7 | 0.2 | 0.2 |
| Epoxy (EpoxAcast ™) 670 HT | 31 | 3.5 | 6.5 |
| Tin | 11 | 45 | 1.5 |
| Aluminum 1100 | 55 | 70-80 | 2-2.75 |
| Aluminum 2200 | 72 | 72 | 2-2.9 |
| Copper | 70 | 128 | 3 |
| Nickel | 110 | 220 | 4 |

The life of the material seems to correlate to the tear and tensile strength as micro tears and cracking that propagates through the adhesive or at the tips of the wedges cause adhesive degradation or more dramatically failure to adhere.

Figure 9:
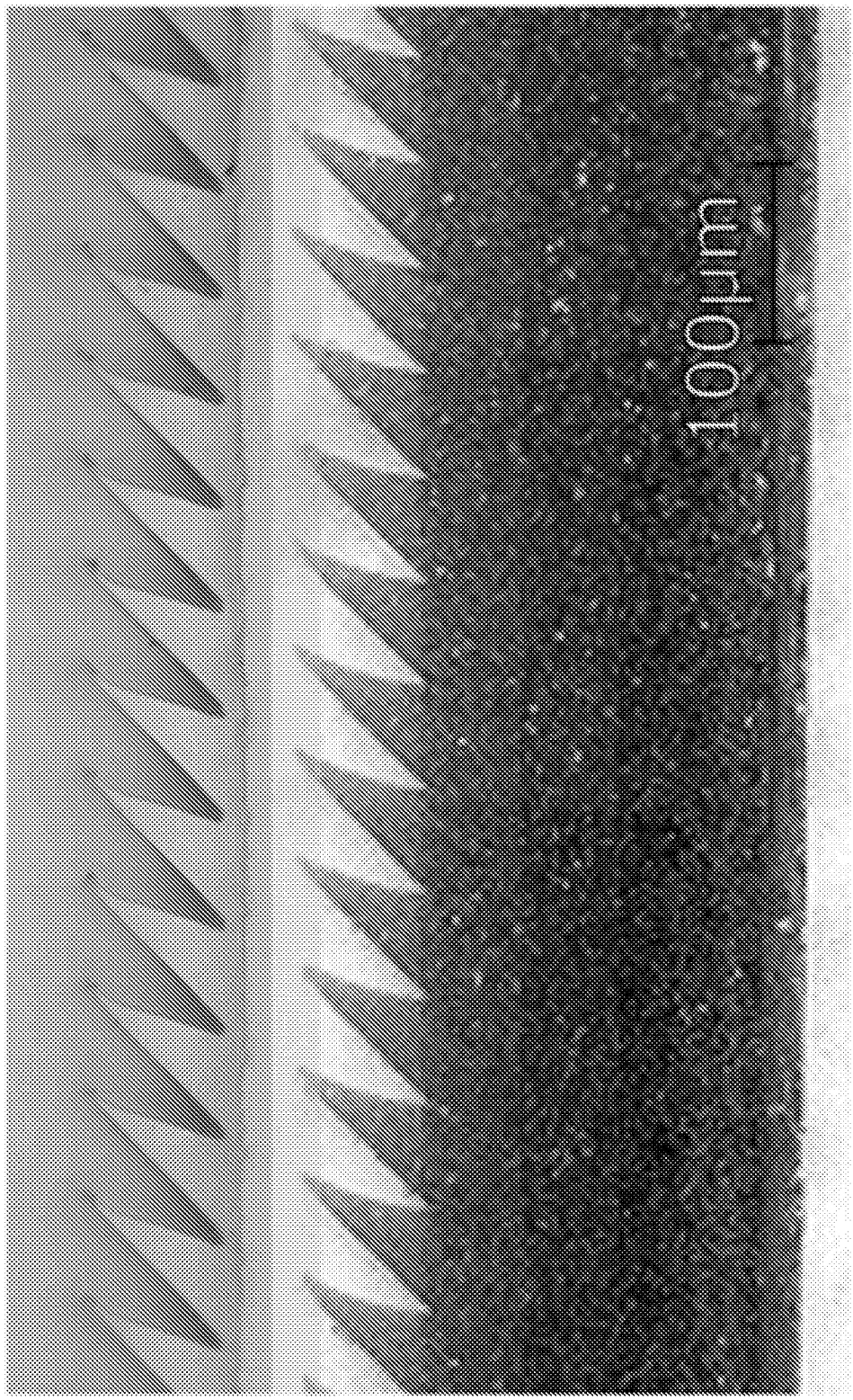
FIG. 9 shows according to an exemplary embodiment of the invention upper microscopic cross section is wedges made from NuSil MED4950 by compression molding in the metal mold. The image below shows a section of wedges made of Syglard 170 with a kapton film backing, cast from a wax mold, for comparison. The images were taken on the Keyence VHX-6000 with magnification 200×, darkfield "ring" lighting.
Figure 10:
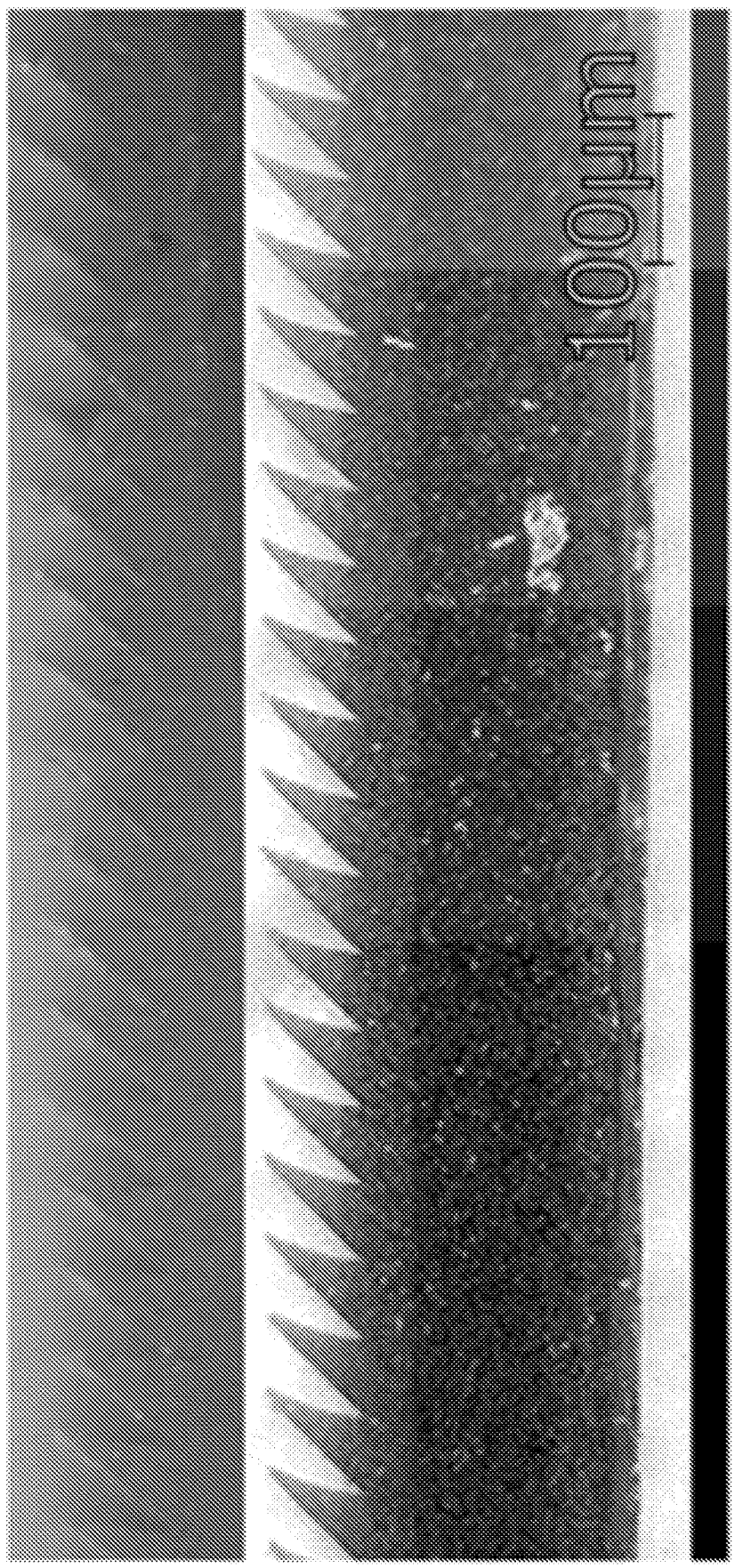
FIG. 10 shows according to an exemplary embodiment of the invention upper microscopic cross section is from the nickel metal mold. The image below shows a section of wedges with a kapton film backing, cast from a wax mold, for comparison. The images were taken on the Keyence VHX-6000 with magnification 200×, darkfield "ring" lighting.

Good results and castable materials have been obtained with Sylgard 170 (Dow Corning, Inc.), Dragon Skin 30 and Mold Star 30 (Smooth-On Polymers, Inc.) and with some space-qualified RTV silicones (e.g. SCV2-2590). The use of tougher materials has not been done before. Looking at the limit curve for NuSil MED 4950 and comparing it to Syglard 170 cast from wax they are not undisguisable (FIG. 9).

Improvements on Metal Mold

Compression molding provides improvements to make the metal mold provided herein a more durable, quicker to fabricate metal mold.

The fine features of a mold can be easily broken if not treated carefully even if care is taken demolding adds stress to the features and could cause deformation. Examining the ideal material for a permanent metal mold will lead to durable, long lasting, and repeatable molds. One would need to examine the yield strength and young's modulus of the material to get a better idea for best material chosen for mold making. After examining Table 3, it is noticed that the wax molds do not have the yield strength for compression molding material to fill the wedges before breaking. The metal molds are more durable and less likely to deform from the casting cycle in particular demolding which typically causes the wedges to break. Epoxy is significantly stronger than wax, but not as strong as metal.

Copper and Nickel are stronger and more durable than aluminum which when deposited has high internal stresses and better than tin as well which is a fairly soft metal. Both electroplated metals are also tougher than epoxy. This led the inventors to consider nickel after initial results from copper were promising, both of which are widely used for mold coatings.

As one can observe in Table 3, nickel has a higher yield strength over copper and almost double the young's modulus. These properties will be advantageous as to ensure the wedges will not bend or break as easily during compression molding nor demolding. Another improvement to the metal mold process is the change of initial wafer from stainless steel to quartz. The stainless steel requires a high amount of force to separate from the original wedges. The quartz wafer is transparent and thus a thin UV tape layer is added before priming and casting the wedges. Once the process is complete the UV tape is exposed to UV light and the wafer comes apart with little to no force. This has greatly improved the demolding process.

Compression Mold Fabrication Process

Figure 7:
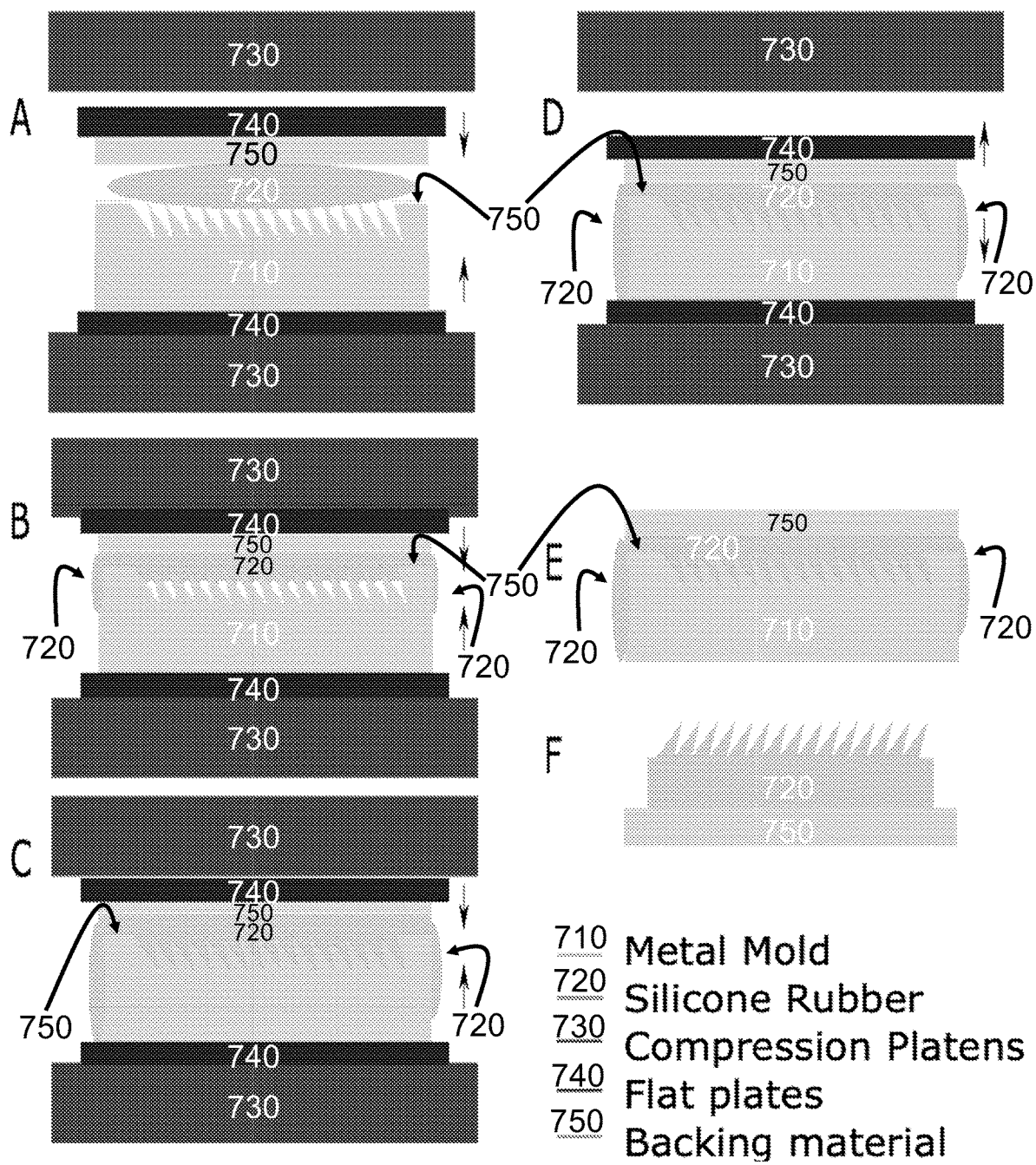
FIG. 7 shows according to an exemplary embodiment of the invention a flow diagram with the steps of compression molding for the metal molds. Labels A, B, etc.

The main steps of creating the adhesive patch through compression molding are shown in FIG. 7. Labels A, B, etc. in FIG. 7 correspond to: A=Setup and Preparation, B=Press, C=Curing, D=Removing from the Press, E=Removal of part, F=Compressing Molded Part as described below.

Setup and Preparation (A)

The process starts with mixing of the material either in a mixing gun or by hand. When mixing the material by hand, as it is a two-part material, one can use the folding and layering technique. The folding and layering technique that bakers use by rolling the material through two cylinders folding in third and rolling through the cylinders again. After 20 folds the material is mixed and ready to roll out thinly to cover most of the adhesive area (76 mm×127 mm inch by 1 mm thick). The material is placed on top of the metal mold along with the backing layer. There are two flat stainless-steel plates 2.5 cm thick on the top and bottom to help with even pressure as well as ease of insertion and removal into the press.

Press (B)

The hydraulic press is quickly activated to guarantee the material does not cure before being pressed into the features.

Curing (C)

The platens apply a pressure of 3.4 MPa and are held at a temperature of 100 deg Celsius during the compression molding. The press is held at this temperature and pressure for five minutes before removal.

Removing from the Press (D)

The hydraulics are then released and the stack is removed from the platens. The mold with the material and backing are either quenched in a bucket of cool water or cooled down to room temperature.

Removal of Part (E)

Once the mold and material has fully cooled a corner of the backing is held to assist with the removal of the part.

Compression Molded Part (F)

The compression molded part is fully cured and ready for application use.

Results

Figure 8:
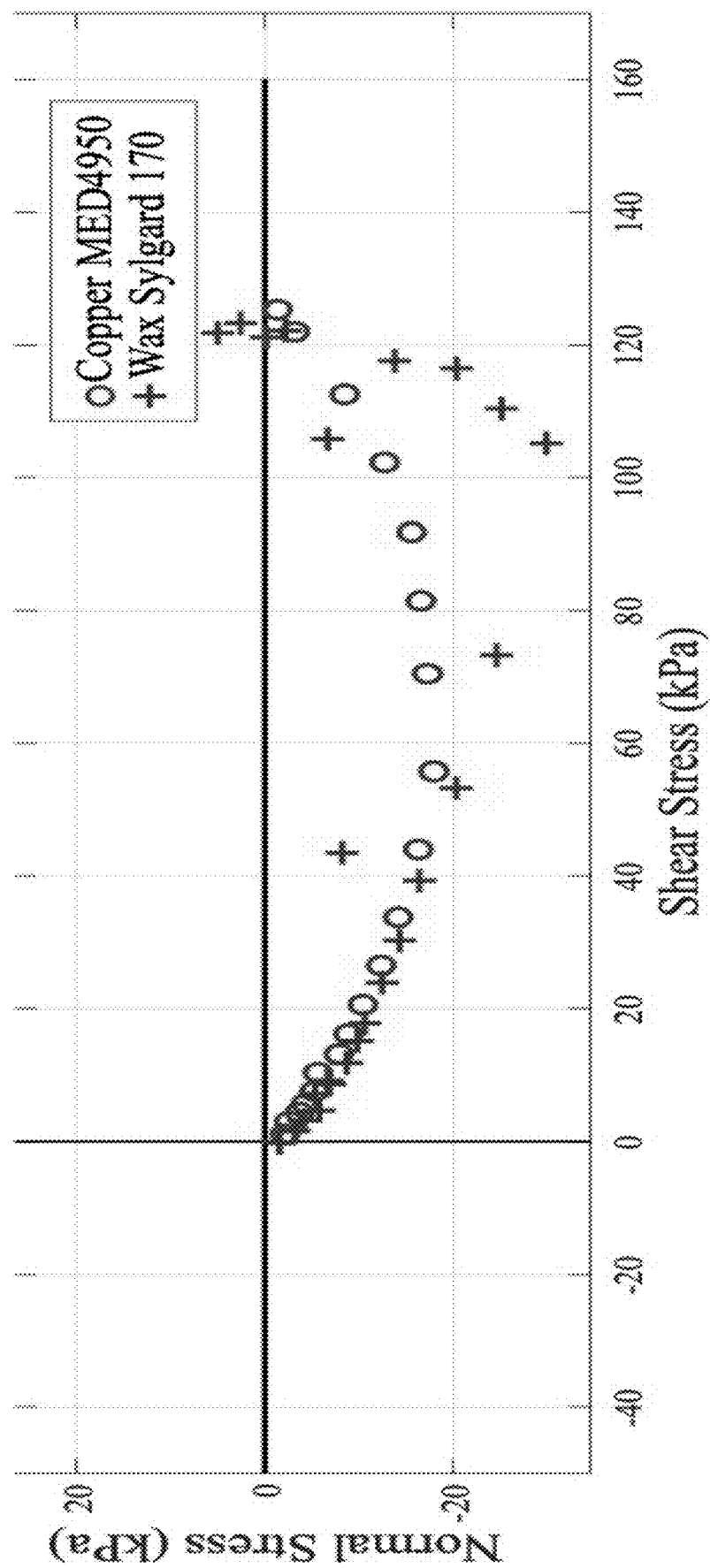
FIG. 8 shows according to an exemplary embodiment of the invention a set of comparison limit curves showing the adhesives cast in metal mold with NuSil MED 4950 compression molding cured in 5 minutes compared to wax with syglard 170 cured at room temperature taking 24 hour cure time. Limit curves of shear and adhesive stresses obtained for adhesive samples with film backing, measured with pull off angles ranging from 0° (normal) to 90° (tangential). Measured limit curves for the first and tenth samples from the metal mold are comparable to those from a single-use wax mold.
Figure 11:
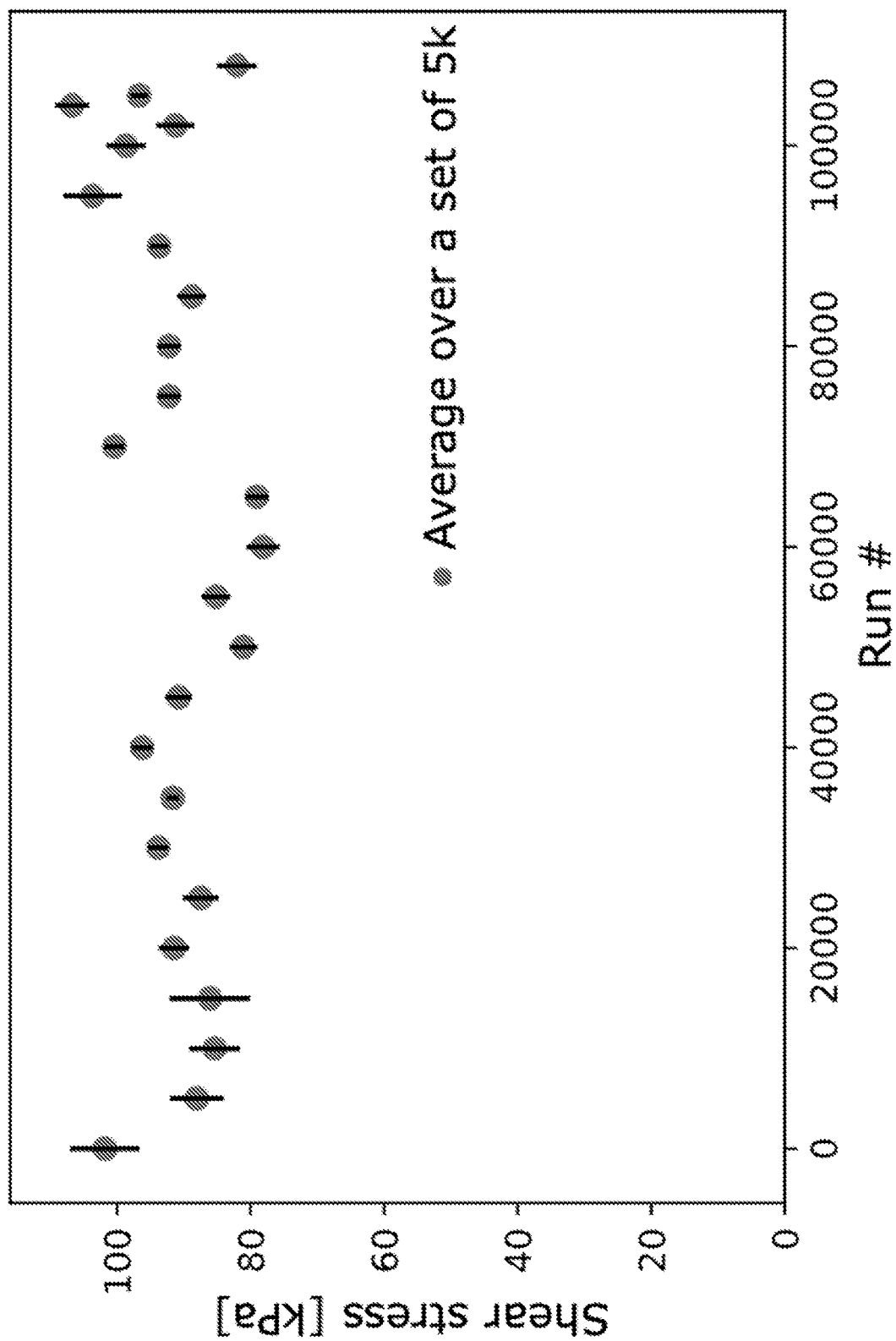
FIG. 11 shows according to an exemplary embodiment of the invention durability over 100,000 cycles with the compression molding NuSil MED 4950 material. The adhesive is loaded to 85% of its maximum shear stress relaxed and repeated over 100,000 cycles.

Limit curves show some test-to-test variability even with the same adhesive and surface (FIG. 8). Hence there is a certain amount of scatter in the data, especially for loading conditions that approach purely tangential (i.e. pure shear). Nonetheless, inspection of the data in FIG. 8 reveals two results. The first is that NuSil wedges yield comparable adhesion results. The material is tougher and thus increasing the lifetime of the adhesive. There will be less tearing in the overall adhesive especially during demolding. The second point is that the nickel mold results are comparable to those from a typical single-use wax mold and copper mold increasing the durability of the mold (FIGS. 9 and 11).

Post Treatment

Post treatment of the gecko adhesives allows for additional adhesion to smooth surfaces. Wedge tips can be deformed, chipped, or have general roughness from the initial mold. This is seen in wax molds. The main reasons could be quartz particles building up and not causing PDMS to flow into the mold all the way or the PDMS wedge being too thin when demolding it tears. The mold could have imperfections in the wedge cavity as well magnifying the situation.

The inventors have identified a post treatment process that increases the wedges tip's smoothness. The limit curve is expanded causing better adhesion. The process for making post treated wedges is very precise and any misalignment will cause the wedges to be adhered to themselves permanently or not have the tips receive any of the unfilled PDMS mixture leaving them the way they started. There are no machining techniques to create such a geometry as this time. After going through the process described below, the inventors have found the wedge tips with post treatment to be preserved for better enhancement of adhesion.

Figure 12:
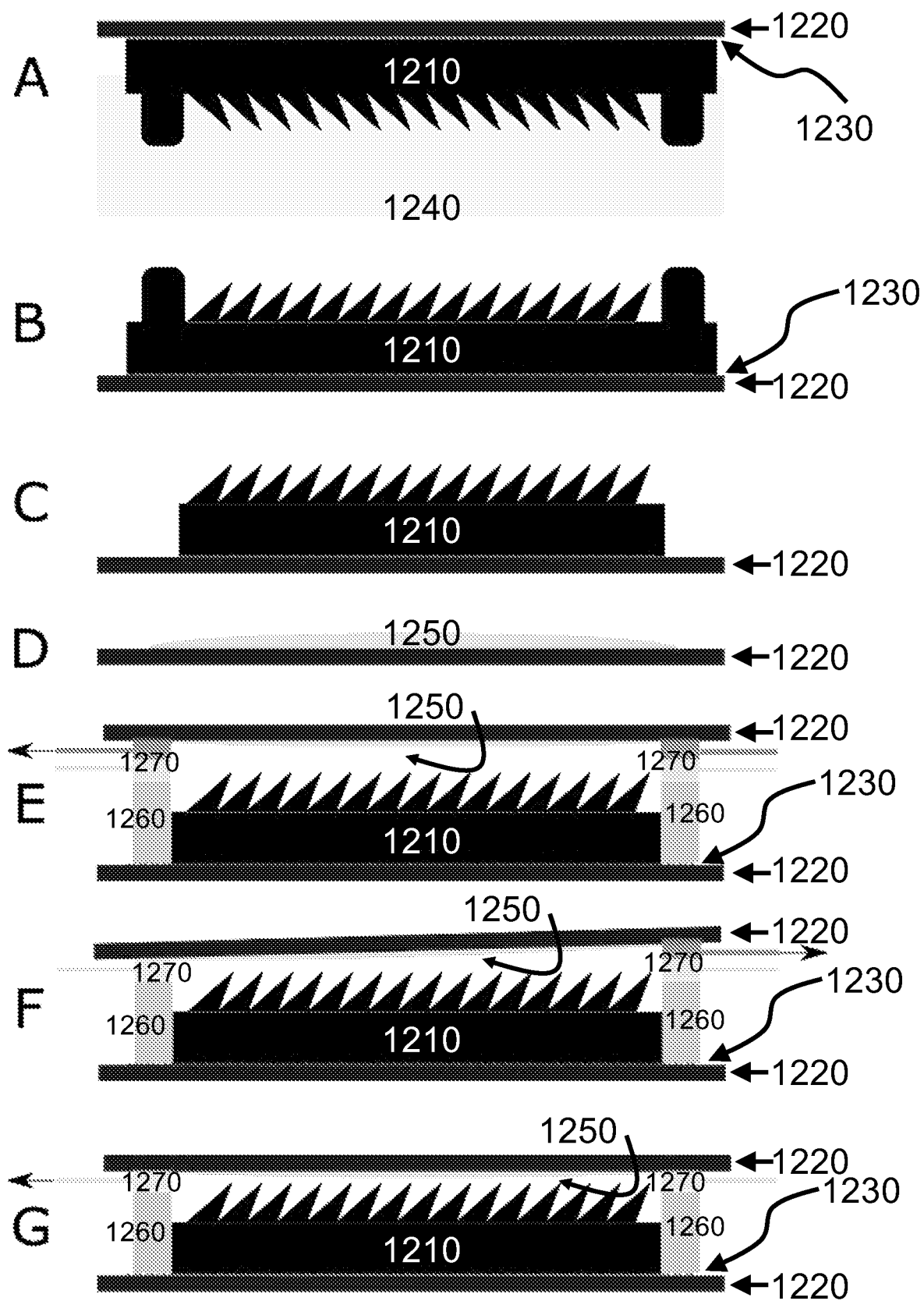
FIG. 12 shows according to an exemplary embodiment of the invention a flow diagram of the steps for a one-person post treatment process. Labels A, B, etc.
Figure 12:
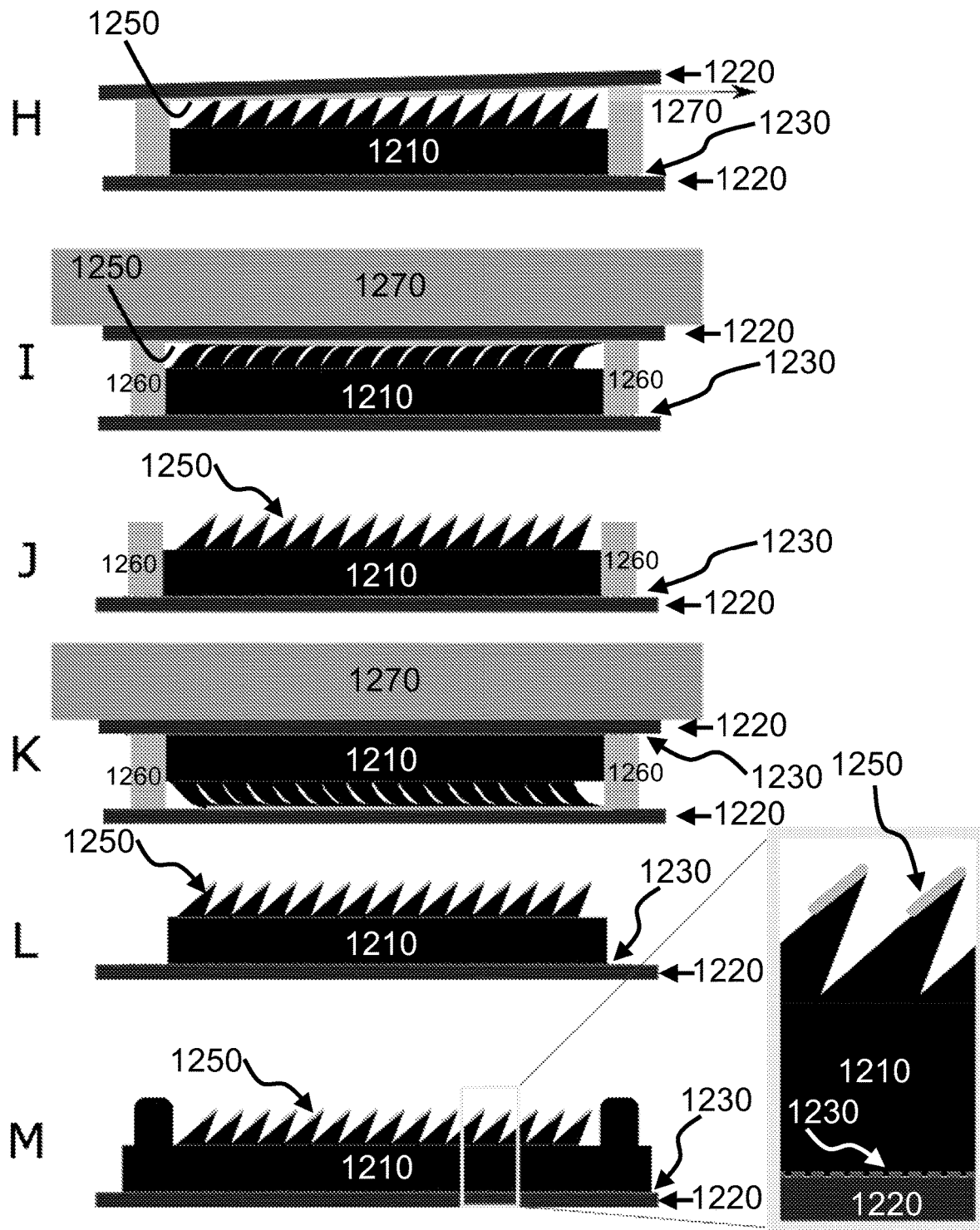

The main steps of the post treatment process are shown in FIG. 12. Labels A, B, etc. in FIG. 12 correspond to: A=Initial Casting, B=Demold, C=Runners Removed, D=Spin Coat Unfilled PDMS, E=Place Wafer Face Down onto Wedges, F-H=Positioning the Inked Surface, I=Inking, J=Inked Wedges, K=Curing, L=Cured, and M=Runner Place Back on the Wafer as described below.

Initial Casting (A)

First the wedges are cast into a mold with a wafer backing lined with a thin primed tape layer.

Demold (B)

The wedges are demolded and inspected.

Runners Removed (C)

The runners are carefully cut out and removed while still being attached to the primed tape layer. This is saved for a later step.

Spin Coat Unfilled PDMS (D)

Take a clear quartz or silicon wafer and deposit unfilled PDMS into the middle. The wafer is placed into a spin coater and spun down to 1-3 µm normally 4000 RPM for 60 seconds.

Place Wafer Face Down onto Wedges (E)

There is a tape stack up with two sets of shims with removable tabs. The spun wafer is placed on top of the stack.

Positioning the Inked Surface (F-H)

These steps show the left shim tab removed followed by the right then the left and right second pair of shims removed. This allows for a slow and precise ease of the inked wafer to come into contact with the wedge tips.

Inking (I)

The wedges are now in contact with the inked wafer and a heavy polished weight is placed on top of the stack for 10 seconds.

Inked Wedges (J)

Now that the wedges are inked, a quick inspection for over inking is done.

Curing (K)

The inked wedges are then placed on a clean wafer on top of a level granite plate upside down with a polished level weight on top. The key to even inking is the alignment and pressure throughout each step.

Cured (L)

The wedges are removed from the clean wafer after 24-48 hours. The tape stacks, which control and keep wedges from over inking, are removed.

Runners Placed Back on the Wafer (M)

The runners are now placed back into the correct position carefully ensuring line up to the wedges.

The wedges are now post treated and ready for replication or use. There are two ways to fabricate a replicative mold: via the metal mold as described above (FIG. 7) or via wax replication in view FIG. 13.

Wax Replicative Process

Figure 13:
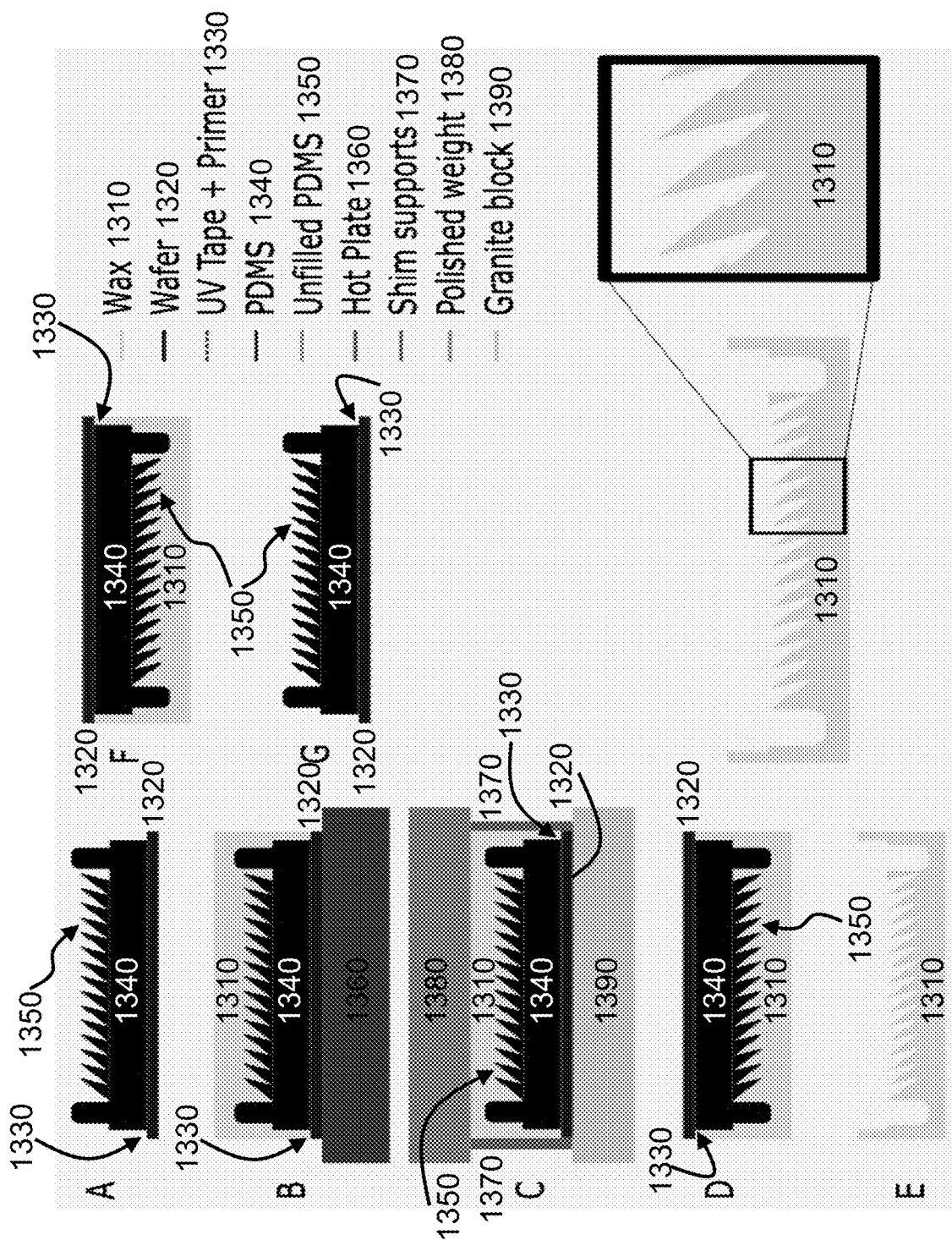
FIG. 13 shows according to an exemplary embodiment of the invention a flow diagram of the steps to replicate the geometry of the post treated wedges. Labels A, B, etc.

The main steps for a replicate process to replicate the geometry of post-treated wedges captured in wax are shown in FIG. 13. The objective is to create a wax mold that possesses geometry non-achievable by a machine. The reason why it can't be achieved by a machine is that the geometry is undercut with a tip that has an additional undercut. The method of FIG. 13 overcomes that issue by encapsulating the geometry in wax. Labels A, B, etc. in FIG. 13 correspond to: A=Start Wedges, B=Heat Wax, C=Guarantee Parallelism and Cooling, D=Hardened Wax, E=Wax Mold with Post Treated Geometry, F=Casting into New Wax Mold, and G=Post Treated as described below.

Start Wedges (A)

First the wedges are cast into a mold with a wafer backing lined with a thin primed tape layer.

Heat Wax (B)

Place the wedges onto a leveled hot plate around 100 degrees Celsius, then place a wax block on top of the wedges. Once the wax has started to melt wait another 30 seconds for the wax to get into the grooves and undercuts.

Guarantee Parallelism and Cooling (C)

After the wax has melted into the grooves the stack is removed and placed onto a level granite surface. Shims are placed around the block to ensure parallelism between the flat weight placed on top of the melted wax level and the granite surface. The stack is then cooled down in room temperature.

Hardened Wax (D)

The wax is now totally cool and hardened. The weight and shims are removed. The wax is inspected for parallelism to the wafer. If it is not parallel it is reheated and cooled.

Wax Mold with Post Treated Geometry (E)

The positive and wafer is then removed. The result is a wax mold with post treated geometry. The process takes under 8 minutes.

Casting into New Wax Mold (F)

The wax mold with post treated geometry is then cast into as a normal wax mold would be with silicone rubber with a primed backing material left to cure overnight.

Post Treated Wedges (G)

The result is cured post treated geometry wedges without the need of post treatment. This less durable mold allows for quick testing of the post treatment geometry and replication.

What is claimed is:

1. A method of making a metal mold for casting an array of directional dry adhesive wedges, comprising:
    (a) casting a silicone layer onto a micromachined mold, wherein the micromachined mold comprises an array of wedges at a surface of the micromachined mold, wherein the casting casts the array of wedges from the micromachined mold into one surface of the silicone layer, wherein the casting comprises using a stainless-steel wafer at another side of the silicone layer, wherein on one side of the stainless-steel wafer, the stainless-steel wafer has a UV tape as a backing material, wherein on another side of the stainless-steel wafer, the stainless-steel wafer is treated with a primer to promote adhesion of the silicone layer to the stainless-steel wafer;

(b) demolding and degassing the cast silicone layer and stainless-steel wafer from the micromachined mold;

(c) sputtering in a vacuum environment a film of titanium and platinum onto the cast silicone layer and stainless-steel wafer, whereby the sputtering includes sputtering the array of wedges of the silicone layer;

(d) electroplating the sputtered cast silicone layer with a layer of copper, wherein the layer of copper has a thickness of about a double height of the array of wedges of the silicone layer;

(e) soldering a copper base block to a surface of the copper layer, wherein the soldering uses an indium solder; and (f) pulling off the cast silicone layer and stainless-steel wafer thereby leaving the electroplated copper layer soldered to the copper base block, wherein the electroplated copper layer has now on one surface an array of wedges which is a mirror-image of the array of wedges of the silicone layer.

* * * * *